Feb. 25, 1941.　　　　E. G. PARVIN　　　　2,233,060
COMBINED CLUTCH AND BRAKE
Filed Dec. 2, 1939　　　2 Sheets-Sheet 1

INVENTOR.
Edward G. Parvin
Darby & Darby
Attorneys.

Patented Feb. 25, 1941

2,233,060

UNITED STATES PATENT OFFICE 2,233,060

COMBINED CLUTCH AND BRAKE

Edward G. Parvin, Roselle, N. J., assignor to National Pneumatic Company, New York, N. Y., a corporation of West Virginia Application December 2, 1939, Serial No. 307,204

4 Claims. (Cl. 172—284)

This invention relates to improvements in magnetic slip clutches and magnetic brakes combined as a single unitary structure.

The general object of the invention is to provide a magnetic slip clutch of a construction particularly adapted to the operation of spoolers or take-up reels for use in conjunction with wire processing machines, as, for example, wire drawing machines, and an associated electromagnetic brake likewise particularly adapted for bringing the spool or reel to a standstill after de-energization of the slip clutch.

The structure of this invention is particularly adapted for use in such combinations as above where extremely fine wire is being processed at high rates of speed.

This invention resides substantially in the combination, construction, arrangement and relative location of parts, all in accordance with this disclosure.

In the accompanying drawings.

In the spooling of strands it is a common difficulty in the art that in the case of fine strands frequent breakage of the strand occurs. This breakage is due in part to the fact that no truly satisfactory arrangement has been provided for compensating for the increase in diameter of the take-up reel as the strand is wound thereon with the result that it has not been possible in the past to maintain a substantially uniform tension in the strand being fed to the reel. Again in the case of fine strands breakage is frequently occasioned during the period of the stopping of the spooler, resulting from the fact that the tension in the strand varies over wide ranges at this time.

The device of this invention has been particularly devised for use in conjunction with spooling mechanism for extremely fine copper wires of a diameter of the order of 0.001". Copper wire of this size is extremely fine and proportionately weak, and being of such light weight a pound thereof represents many thousands of feet. For the efficient handling thereof, not only in drawing it but in processing it, as in annealing, enamelling, and the like, it is desirable to operate at high speeds in order to reduce the cost of processing. The device of this invention is capable of operating a spooling mechanism to reel up copper wire of the diameter referred to above at a speed as high as a mile per minute and to bring the spooling mechanism to rest, all without breakage or stretching of the wire.

Figure 1:
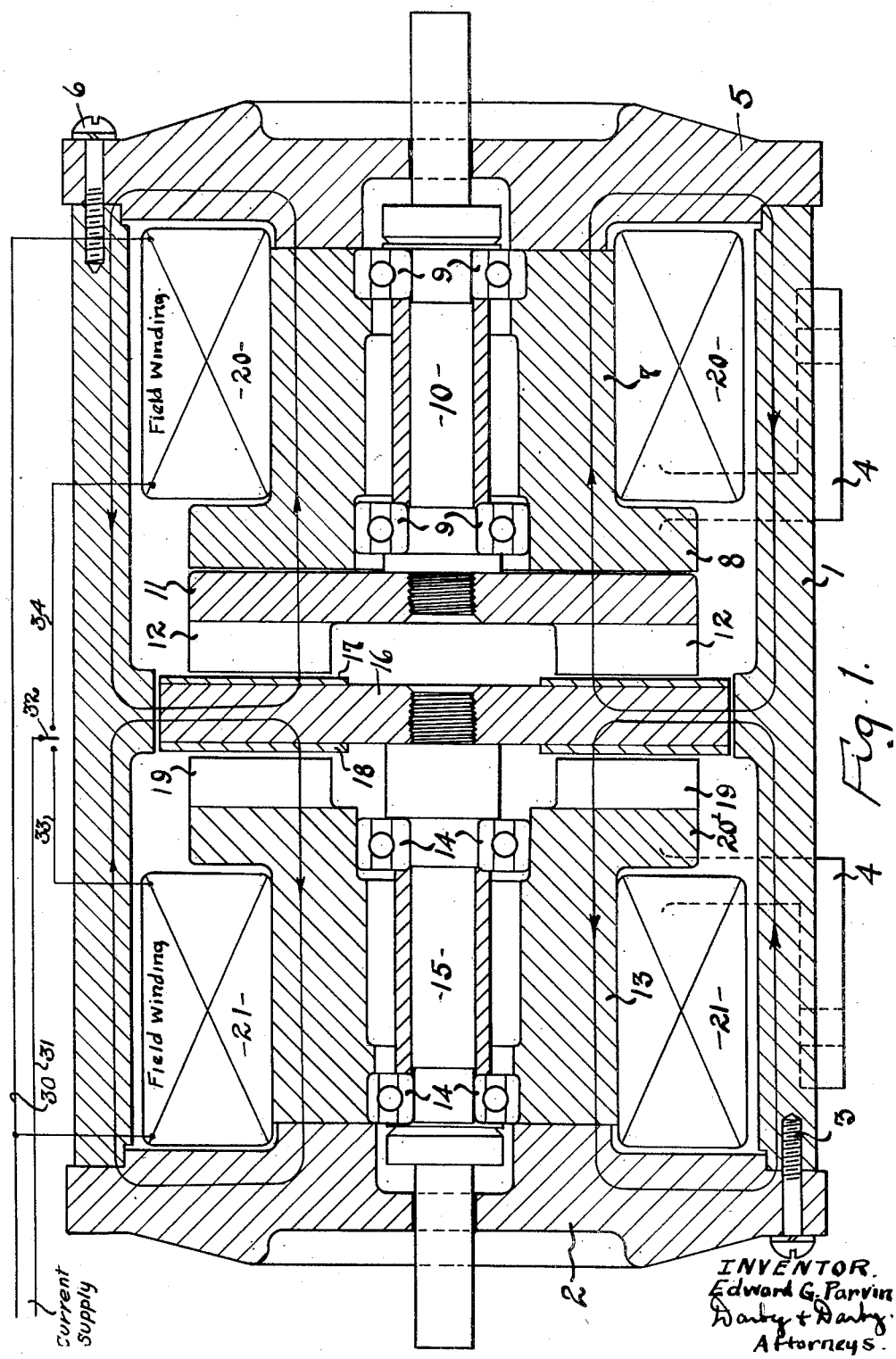
Figure 1 is a longitudinal, central, cross-sectional view through one form of device in accordance with this invention.
Figure 2:
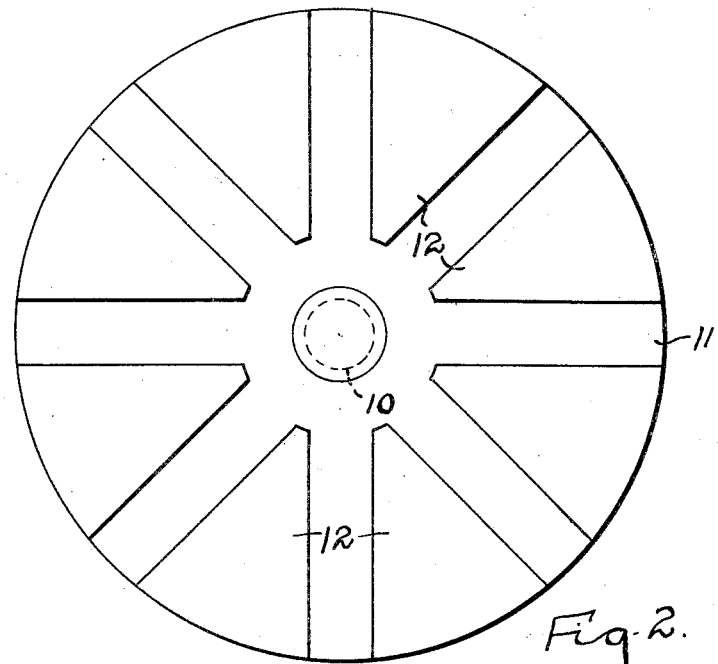
Figure 2 is a front elevational view of one of the rotors of the slip clutch.

As illustrated in Figure 1, the combined clutch and brake includes a housing 1, preferably of cylindrical cross-section, made of suitable magnetizable material and closed at the ends by removable covers or caps 2 and 5 held thereto by suitable screws or bolts 3 and 6, respectively. These covers or caps are likewise preferably made of magnetizable material. The housing thus formed is mounted by means of suitable feet 4 integral therewith. Secured concentrically with each other to the inner faces of the covers 2 and 5 and concentrically therewith are the opposed magnetizable poles 13 and 7. These poles can be secured to the covers in any suitable manner, as by means of bolts, not shown. The pole or core 7 terminates in a flanged head 8 forming a pole piece having a flat terminal face and preferably of circular cross-section. In a similar way the core or pole 13 is provided with a pole head 20', which in turn is provided with a series of segmental-shaped poles 19 on the terminal face thereof. These poles 19 may have any suitable shape, as, for example, those which would be complementary to the poles 12 on the rotor 11 as illustrated in Figure 2.

The core 7 is provided with a central passage in which are mounted suitable bearings, such as the roller type as indicated at 9, in which is journalled the shaft 10, which projects at one end through the cover 5 and is provided at its other end with a magnetizable rotor 11. As illustrated in Figure 2, this rotor is provided with a plurality of poles 12 on the face thereof, which may be segmental in shape. A suitable magnetizing winding 20 surrounds the core 7.

The core 13 likewise has a central passage in which are mounted suitable bearings 14 for rotatably supporting a shaft 15 which is axially aligned with the shaft 10. The shaft 15 projects through the cover 2 and is provided on its other end with a magnetizable rotor 16.

Figure 3:
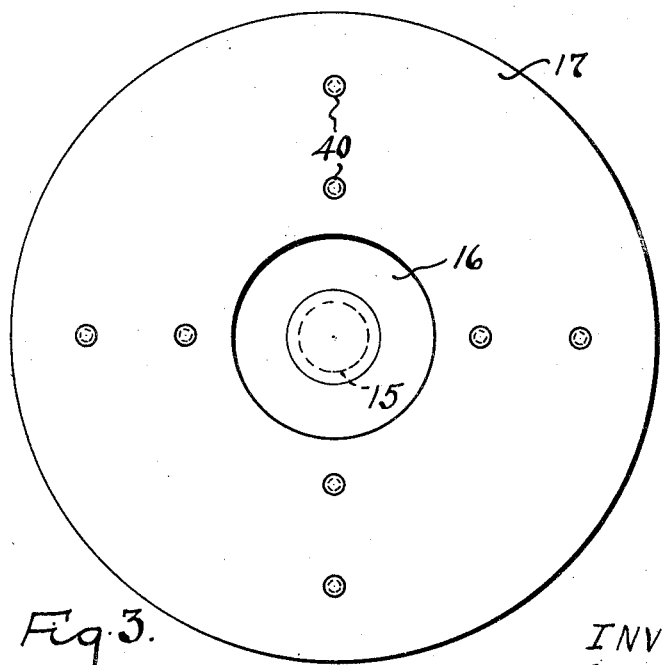
Figure 3 is a front elevational view of the rotor which cooperates with the other rotor of the slip clutch or with the magnetized field of the brake, depending upon which function is being performed.

As illustrated in Figure 1, there is secured to the two faces of the rotor 16 the conducting rings 17 and 18, providing what may be termed squirrel-cage windings which may be constructed in any other suitable form. The rotor is shown in Figure 3 in elevation, illustrating the conducting ring 17. The ring 18 is of the same construction and the two rings are secured on opposite faces of the magnetizable disc 16 in any suitable manner, as by rivets 40. It is immaterial whether the rings are insulated from the disc 16 and from each other. The rotor 16 is journalled for rotation with as little clearance as is mechanically possible between it and the faces of the poles 19. The rotor 11 is likewise journalled for rotation with a minimum of clearance between the pole face 8 and the rotor 16. The core 13 is provided with a suitable energizing winding 21 which surrounds it, as indicated in Figure 1. The energizing circuits of the windings of the machine are shown diagrammatically in Figure 1. One terminal of each of the windings 20 and 21 is connected to a current supply wire 30. The other wire of the supply circuit, that is, wire 31, is connected to the movable contact 32 of a single pole double throw switch. The fixed cooperating contacts are respectively connected by the wires 33 and 34 to the other terminals of the windings 21 and 20. As will be apparent to those skilled in the art, the two windings by the proper operation of switch 32 may be independently energized.

The slip clutch portion of this device is shown in greater detail in my co-pending application Serial No. 280,768, filed June 23, 1939. One suitable form of reeling mechanism with which the combined clutch and brake of this application may be used is disclosed in my co-pending application Serial No. 307,203, filed December 2, 1939, for Reeling mechanism.

In the operation of this mechanism, a suitable driving motor is connected to shaft 10 to effect rotation thereof at a desired speed. The take-up reel or spool or other mechanism to be driven by the clutch is connected to the shaft 15. With winding 20 energized and rotor 11 revolving, this rotor, in effect, being a revolving pole piece for the core 7, the sweep of the magnetic lines of force around the disc 16 will induce a current in the conducting ring 17 which causes the shaft 15 to revolve by reason of the interaction of the resulting magnetic fields. Thus shaft 15 revolves at some speed less than that of shaft 10.

When it is desired to bring rotor 16 and any parts connected thereto to rest, winding 20 is de-energized and winding 21 is energized. The magnetic field of this winding reaches the conducting ring 18 through the poles 19, inducing a current in this ring to produce an interaction between the resulting magnetic fields, which gradually brings the rotor 16 to rest. In each case, of course, the windings 20 and 21 are energized with direct current, with the result that during the braking operation the retarding force falls off as the disc 16 and the connected parts slow down. The paths of magnetic flux through the various parts of the machine when the respective windings are energized, have been indicated in Figure 1. It will be seen that the magnetic circuit for either winding includes the rotor 16 which is ensured by the fact that this rotor approaches closely adjacent to the housing 1, while the rotor 11 is more distantly spaced with respect thereto, as are the pole heads 8 and 20'.

The current in these windings may be varied in some suitable way to further aid in maintaining a uniform tension in the wire going to the take-up reel during running and slowing down, as disclosed, for example, in my second application mentioned above. It may be noted, as will be apparent to those skilled in the art, that it is immaterial which of the shafts 10 and 15 is connected to the driving motor and which is connected to the mechanism to be driven. In other words, the device is reversible in this respect and for this reason it is not intended in any of the claims to limit the structures thereof so that a particular one of these shafts is the driving or driven member.

From the above description it will be apparent to those skilled in the art that the details of construction herein set forth for the purpose of illustrating the principles of this invention may be varied without departure from the novel subject matter herein disclosed. I do not desire, therefore, to be strictly limited to the disclosure but rather by the scope of the claims granted me.

What I claim is:

1. A combined magnetic clutch and brake consisting of a magnetizable housing having a pair of magnetizable opposed cores, magnetizing windings for said cores, a pair of aligned shafts journalled concentrically with said cores having magnetizable rotors on their adjacent ends, one of said rotors being closely coupled with said housing and the other widely separated therefrom, one of said rotors having poles on the face thereof and the other having a squirrel-cage winding thereon, and one of said cores having poles on its face, the windings on either core creating magnetic fields closed through the housing and the closely coupled rotor.

2. In a device of the type described, the combination including a magnetizable housing having a pair of aligned reentrant cores, the terminal faces of said cores being spaced, independently energizable magnetizing windings on said cores, a pair of aligned shafts journalled for rotation in said housing, magnetizable rotors on the adjacent ends of said shafts, lying in the space between the cores, one of said rotors having poles on the face thereof and one of said cores having poles on its face, the other rotor lying between said sets of poles, being closely spaced to said housing and having a short-circuited winding thereon, the other rotor being relatively widely spaced from said housing whereby energization of either winding will create a magnetic field completed through the housing and closely spaced rotor.

3. In a combined slip clutch and brake, the combination including a pair of aligned spaced magnetizable poles, one of said poles having a smooth face and the other being provided with projecting pole pieces, a pair of aligned shafts, rotors mounted on the adjacent ends of said shafts and lying in the space between said poles, pole pieces on the face of one of said rotors, short-circuited windings on the other of said rotors, a magnetizable support forming a magnetic field between said poles and having a peripheral projection closely adjacent to the periphery of one of said rotors, the periphery of the other rotor being relatively widely spaced from said support, and means for alternately magnetizing said poles whereby the magnetization of one pole produces a slip clutch action, while magnetization of the other pole produces a braking action.

4. In a combined slip clutch and brake, the combination including a magnetizable structure having a pair of poles relatively positioned to form a space, magnetizable windings for said poles, a pair of aligned shafts journalled for rotation, magnetizable discs on said shafts lying in said space so as to be rotated in parallel planes, one of said discs having poles on its face and the other of said discs having conducting members on both faces thereof, the latter of said discs being magnetically closely coupled to said magnetizable structure whereby energization of either winding will create a magnetic field completed through said structure and closely coupled disc.

EDWARD G. PARVIN.